Oct. 28, 1924. 1,513,357

O. T. WEBBER

PORTABLE FOOD TABLE

Filed Oct. 22, 1921  5 Sheets-Sheet 1

Oct. 28, 1924.  
O. T. WEBBER  
PORTABLE FOOD TABLE  
Filed Oct. 22, 1921  
1,513,357  
5 Sheets-Sheet 2

Witness!  
Geo. C. Davison

Inventor  
Owen T. Webber  
By Wilkinson, Huxley, Byron & Knight  
Attys

Oct. 28, 1924.

O. T. WEBBER 1,513,357

PORTABLE FOOD TABLE

Filed Oct. 22, 1921     5 Sheets-Sheet 3

Witness:
Fred C. Davies

Inventor
Owen T. Webber
Wilkinson, Huxley,
Byron & Knight
Attys

Oct. 28, 1924.
O. T. WEBBER
PORTABLE FOOD TABLE
Filed Oct. 22, 1921
1,513,357
5 Sheets-Sheet 4
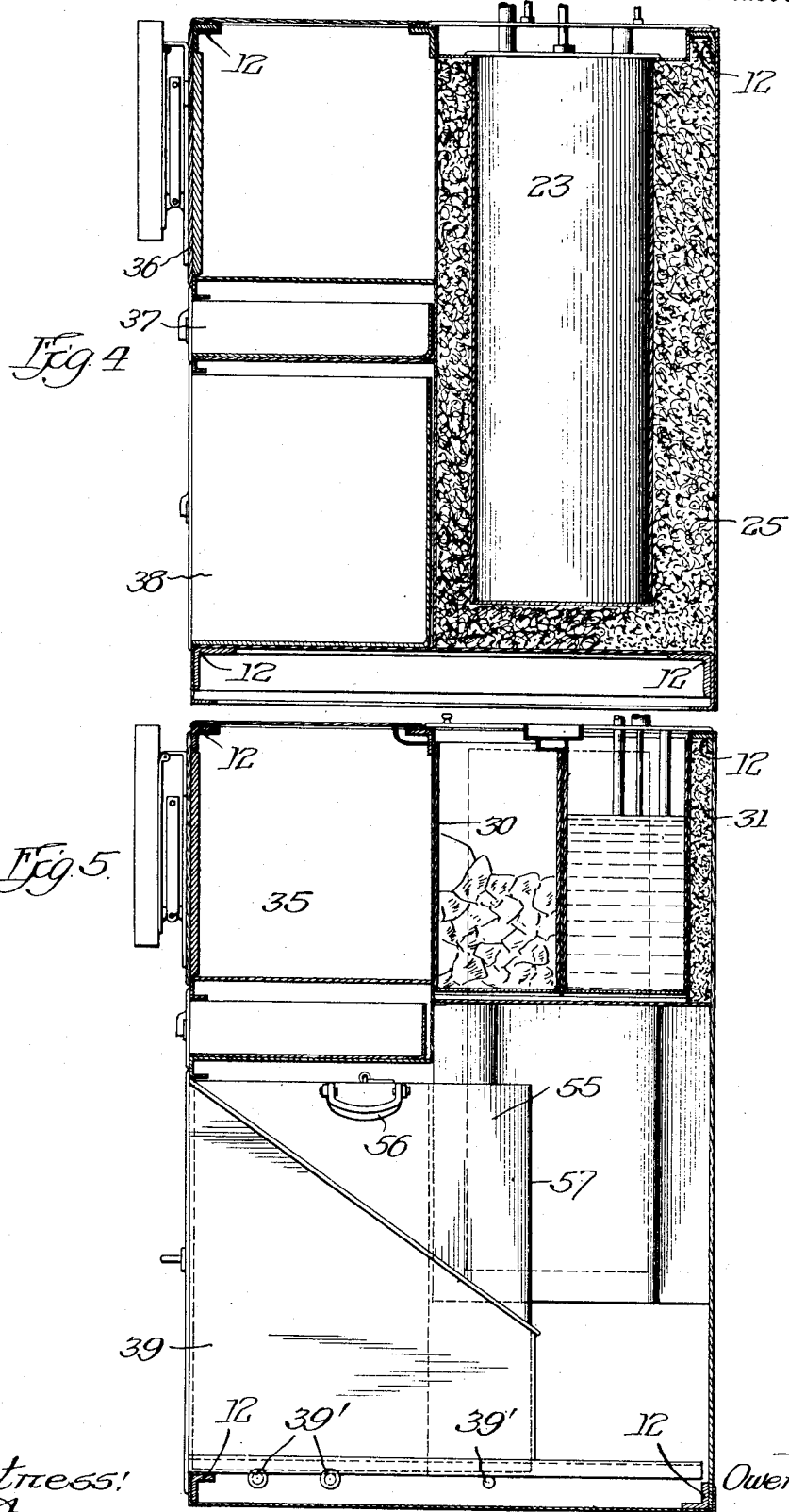

Oct. 28, 1924.

O. T. WEBBER

PORTABLE FOOD TABLE

Filed Oct. 22, 1921  5 Sheets-Sheet 5

1,513,357

Inventor
Owen T. Webber

Patented Oct. 28, 1924.

1,513,357

UNITED STATES PATENT OFFICE.

OWEN T. WEBBER, OF CHICAGO, ILLINOIS, ASSIGNOR TO MARSHALL FIELD & CO., OF CHICAGO, ILLINOIS, A CORPORATION OF ILLINOIS.

PORTABLE FOOD TABLE.

Application filed October 22, 1921. Serial No. 509,657.

*To all whom it may concern:*

Be it known that I, OWEN T. WEBBER, a citizen of the United States, residing at Chicago, in the county of Cook and State of Illinois, have invented certain new and useful Improvements in Portable Food Tables, of which the following is a specification.

The present invention relates to portable food tables.

More particularly the present invention relates to portable means for holding food whereby said food may be conveniently served. The present invention is particularly useful for service in hospitals, for the reason that, in addition to the advantage of ready portability, the present invention presents advantages; due to the fact that, by simple changes, it is readily adaptable for carrying the foods required for special diets.

An object of the present invention is to provide a portable food table, by means of which all the food and utensils necessary for feeding a large number of people can be compactly and conveniently arranged in a single vehicle.

A further object is to provide a portable food table in which food may be kept hot, by means of steaming hot water baths, but in which there is very little likelihood of splashing in transit.

A further object is to provide a construction in which, by a few very simple changes, the table may be conveniently arranged for carrying receptacles used in serving any preferred diet.

A further object is to provide a portable food table, in which hot food may be kept hot and cold food may be kept cold without the disadvantage of undesirable heat transfer.

A further object is to provide a portable food table which is compact, which will carry a large amount of food, and by means of which quick service may be accomplished.

Further objects will appear as description proceeds.

Referring to drawings, Figure 1 is a front elevation of a portable food table embodying the principles of the present invention.

Figure 1:
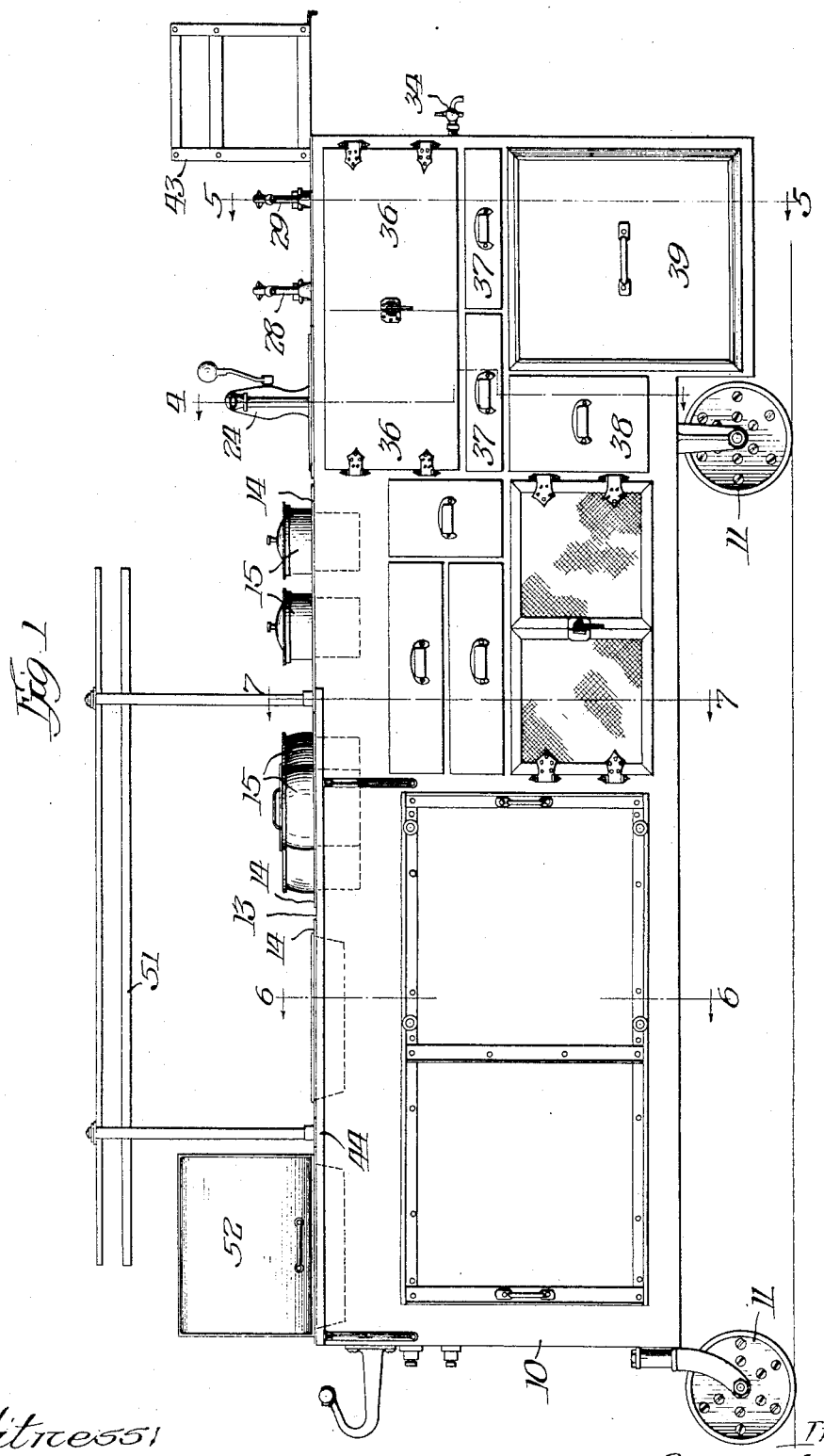

Figures 4 and 5 are sectional views taken along the lines 4—4 and 5—5 respectively of Figure 1.

Figure 6:
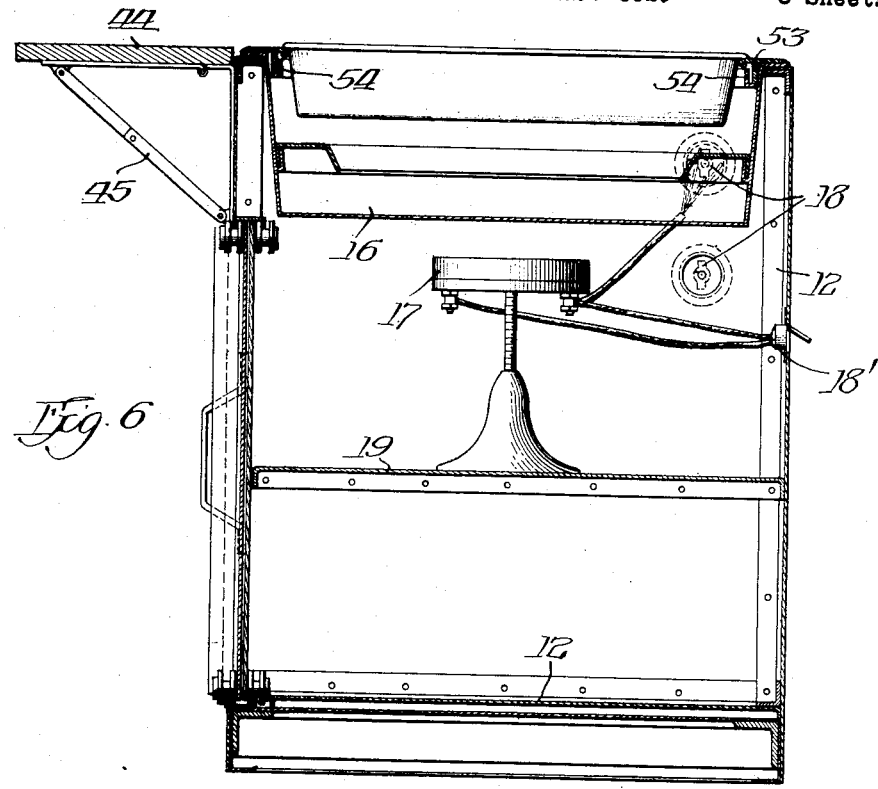
Figure 7:
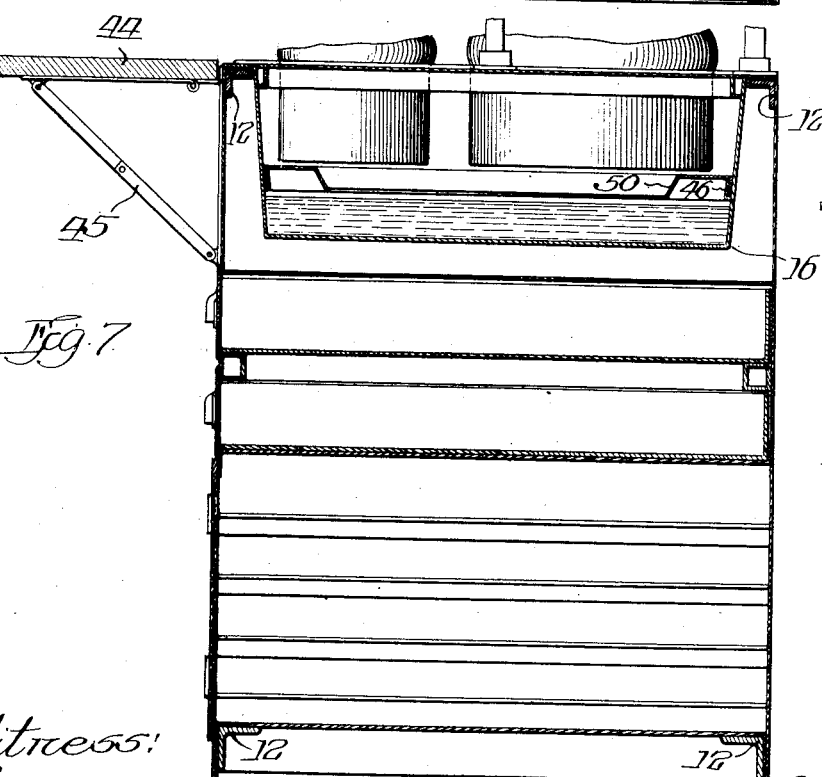

Figures 6 and 7 are sectional views taken along the lines 6—6 and 7—7 respectively of Figure 1.

Figure 8:
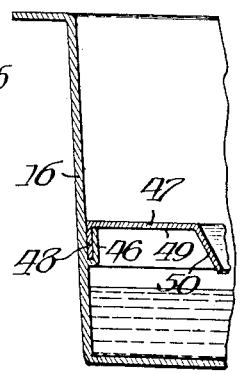

Figures 8, 9, and 10 illustrate details of construction, Figure 10 being a sectional view taken along the line 10—10 of Figure 9.

Before proceeding to a detailed description of the present invention, it may be stated that the invention contemplates a vehicle possessing the necessary sturdiness for conveying a quantity of food for feeding a relatively large number of people. The vehicle is mounted on wheels and is adapted to be moved about from place to place. Means are provided for holding receptacles for food, with means for keeping certain kinds of said food hot and means for keeping other kinds of said food cold. Provision is also made for carrying food which should be maintained at approximately the atmospheric temperature, and provision is also made for carrying dishes, glassware, knives, forks, spoons and other utensils which may be found necessary. Inasmuch as moving a vehicle of this nature from place to place involves the transportation of hot water, with the consequent danger of splashing, the present invention contemplates means for preventing such splashing.

The food table, according to the present invention, is capable of adaptation to any particular form of diet, without material change. Readily interchangeable means are contemplated whereby to receive any desired combination of pots or pans, whereby the table may be used efficiently for different kinds of diets. For example, the table may be used for a purely vegetable diet, in which only vegetable jars are carried, or, if desired, the table may be readily adapted for carrying meat pans exclusively. Any desired combination of food receptacles, within wide limits, may be carried without changes in the body of the table.

The food table in the present invention comprises a body portion 10, which is mounted upon a set of suitably swiveled wheels or casters 11—11. The body portion 10 may be made up of steel angle pieces 12—12, which may be secured together to form a rigid structure. The top portion 13 of the body 10 will be provided with a number of apertures for receiving collars 14—14, which will be referred to more in detail hereinafter. Said collars 14—14 are provided with apertures for receiving food receptacles 15, which may be of any of the convenient shapes found advantageous in practice.

Figure 3:
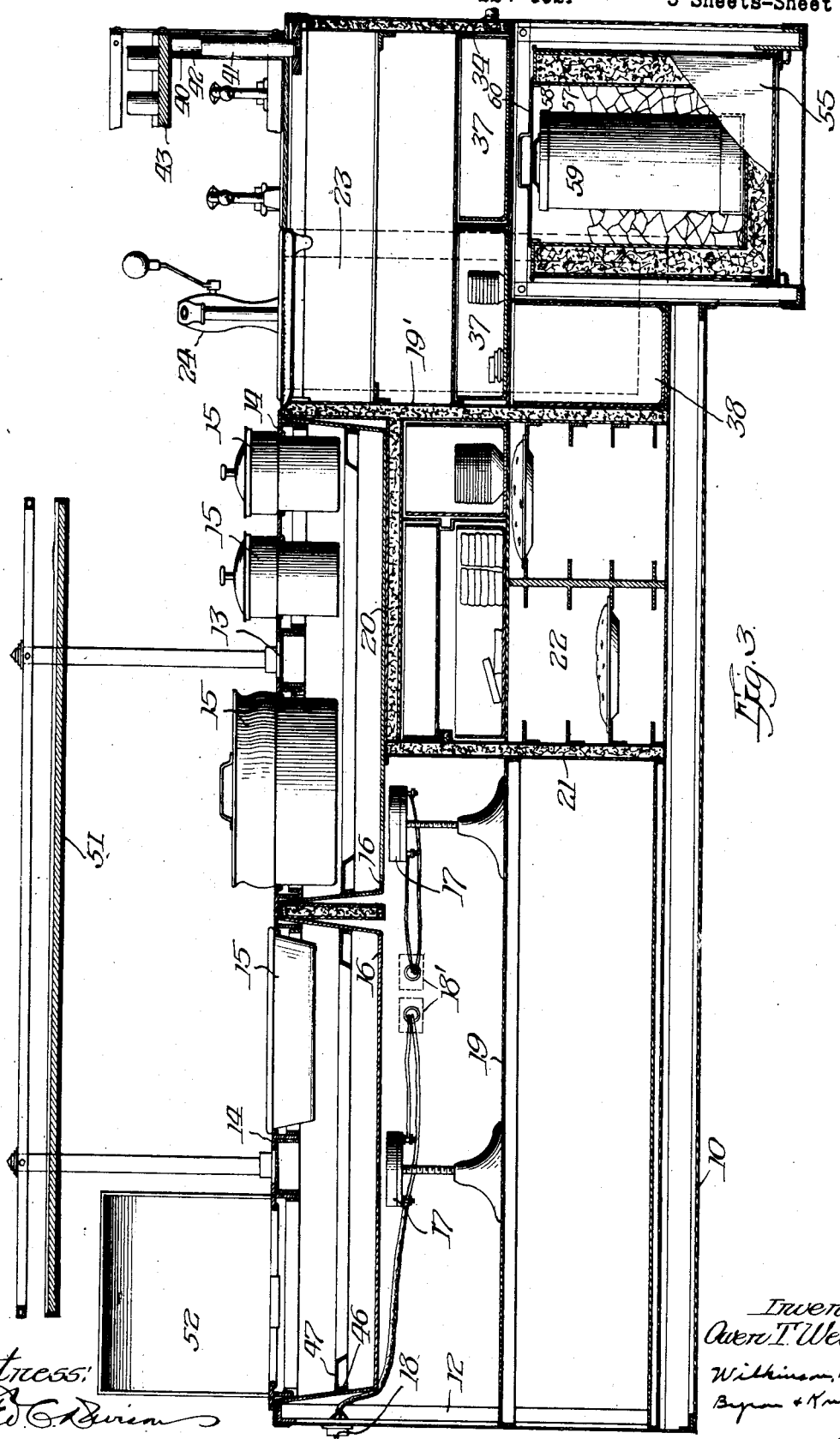
Figure 3 is a sectional view taken along the line 3—3 of Figure 2.

According to the structure best illustrated in Figure 3, the hot parts of the food table, the cold parts thereof, and the parts to be kept at atmospheric temperature are separated by insulation. The body portion 10 carries a pair of water pans 16—16, the water in which may be kept at a steaming temperature by means of heaters 17—17, which may be in the form of electric heaters, and which may be controlled by suitable switch mechanism indicated by the numeral 18. The numeral 18' indicates an electric socket by which connection may be made with a supply circuit. The heating devices 17—17 may be mounted upon a shelf 19 within the body portion 10. The space beneath the shelf 19 may be utilized for the reception of roasts, dishes or anything else which should be kept warm.

To the right of the water pans 16—16 is the vertical insulating wall 19', which effectually insulates the right hand end of the food table from the heat of said water pans 16—16 and from the heat emitted by the heaters 17—17. The numerals 20 and 21 indicate walls of insulating material which enclose a chamber indicated by the numeral 22. The chamber 22 may be made up of a plurality of receptacles for holding food or utensils which are to be kept at atmospheric temperature, as, for instance, pies, cake, dessert dishes, ice cream dippers and silverware.

Immediately to the right of the wall 19, and located at the rear of the food table, is the coffee receptacle 23, which may be provided with a pump 24 for supplying coffee. Said coffee receptacle 23 will be completely surrounded by insulating material 25 whereby the coffee may be maintained at a proper temperature. Adjacent to the insulating coffee receptacle 24 are receptacles 26 and 27, one of which may contain cream, and the other of which may contain milk or other cold drink. Pumps 28 and 29 will be provided for drawing fluid from the receptacles 26 and 27. Placed in front of the receptacles 26 and 27 is the ice box 30 shown in Figure 5. Ice within the ice box 30 will keep the fluids within receptacles 26 and 27 at a low temperature, the receptacles 26 and 27 being suitably insulated from other surrounding parts of the table to reduce undesirable heat transfer. The numeral 31 indicates such insulation. A drain 32 is provided beneath the outlet of pump 24, and drains 33—33 are provided beneath the outlets of pumps 28 and 29. The drains 32 and 33 communicate with the drain spigot 34, which is placed in proper position to drain off water from the ice box 30. Immediately in front of the ice box 30 is a chamber 35, having a pair of doors 36—36, which chamber may be utilized for holding desserts which should be kept cold, such as custards and puddings. Immediately below the chamber 35 are a pair of drawers 37—37. Beneath the drawers 37—37 is the drawer 38 and the drawer 39. Drawers 37 and 38 may be used for butter and other foods or utensils which should be kept cool, and the drawer 39 may be used as an ice cream container. Inasmuch as drawer 39 will be heavily loaded, it is provided with roller bearings 39'—39', whereby said drawer may be readily operated. The details of the drawer 39 will be described hereinafter.

Figure 2:
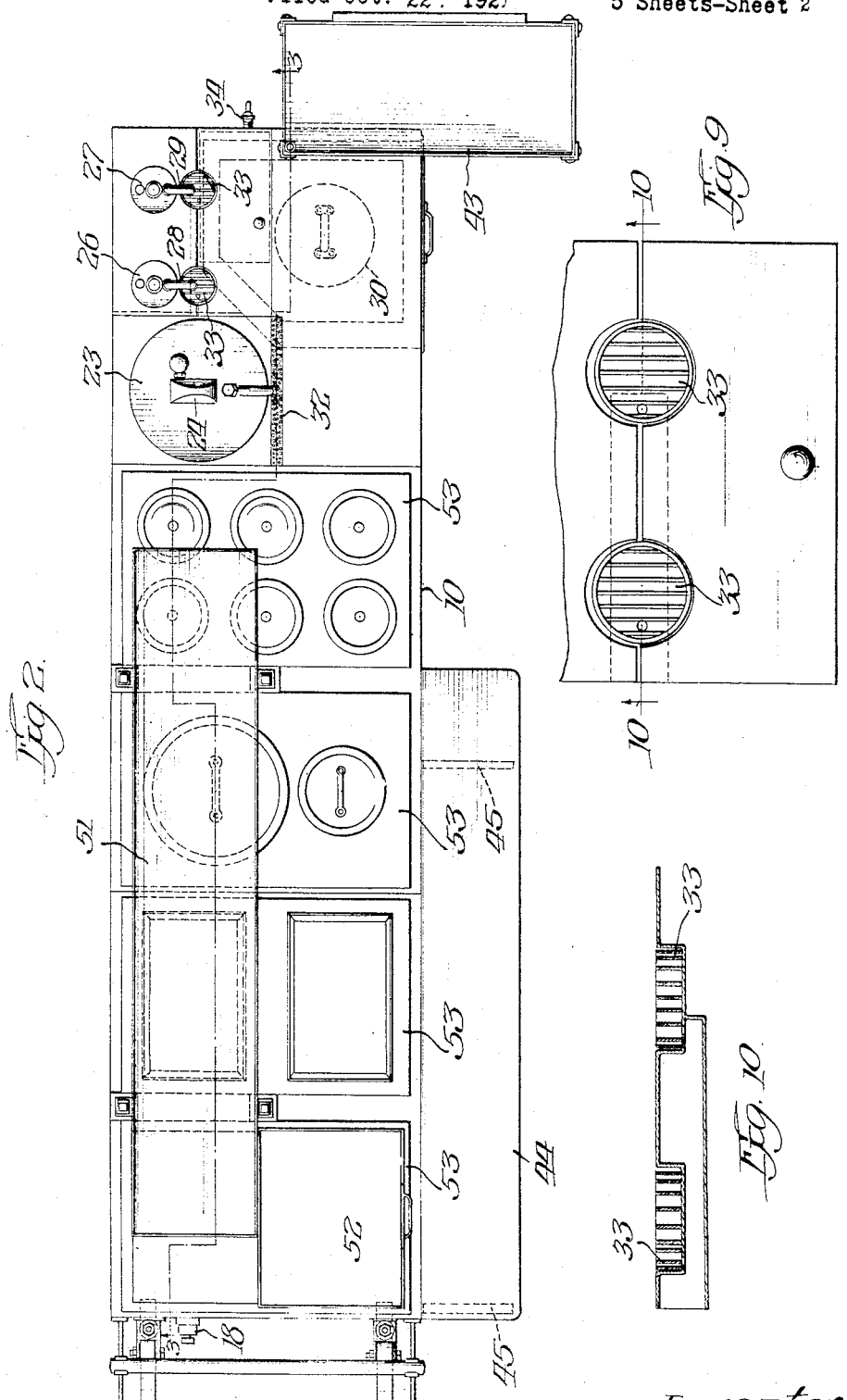
Figure 2 is a top plan view of the construction illustrated in Figure 1.

Mounted at the right hand end of the table as viewed in Figures 1, 2, and 3, is a vertically placed swivel connection, indicated by the numeral 40. Said connection comprises an upstanding stud 41, which is secured to the food table. Surrounding the stud 41 is the pipe 42, which should fit said stud with sufficient closeness to prevent shaking, but which should be freely rotatable upon said stud. Mounted upon the pipe 42 is the rack 43 for carrying glassware and cups and saucers and other utensils needed in connection with the serving of coffee and cold drinks. The rack 43 will be rectangular in plan view and may be swung through an angle of substantially 90 degrees. When the food table is being moved about from place to place, the rack 43 will be moved to a position over the body of the food table, whereby to be unobtrusive. When the food table is stationary and service is being had therefrom, the rack 43 will be swung out into the position indicated in Figure 2, whereby access may be conveniently had to the receptacle 23 and receptacles 26 and 27. The rectangular space in front of the receptacle 23 and the ice box 30 will constitute a serving table.

Mounted at the front of the table at the left hand end thereof, as viewed in Figures 1 and 2, is the tiltable serving board 44, which may be held up in the plane of the top of the food table by means of collapsible struts 45—45, best illustrated in Figures 6 and 7. Said serving board 44 may be readily moved down out of conspicuous position when the steam table is being trundled about.

The means for preventing splashing of the water within the hot water pans 16—16 will now be described.

At a point above the water level in each of said pans, is a shoulder 46, which should preferably extend entirely around the inside of the pan. The shoulder 46 provides a groove for receiving the splash protector or baffle 47, which, as indicated in Figure 8, is provided with a downwardly extending flange 48, fitting within shoulder 46. The splash protector or baffle 47 has a horizontal portion 49 and a depending member 50. The splash protector 47 will extend entirely around each of the pans and will act as a baffle to stop any water which may be thrown upwardly during movement of the food table. Any such water will drop back into the pan from the depending portion 50, which will operate as a water shedder. Said splash protector will not interfere with the functions of the hot water in supplying heat to the food receptacles, inasmuch as said splash protector only rims the pans 16—16, leaving the middle portions of said pans free.

The numeral 51 indicates a rack upon which dishes may be conveniently stacked, while the numeral 52 indicates a shield or oven for covering a roast.

Placed above the pans 16—16 are a plurality of plates or units 53, which may be held in place on the top of the food table by means of shoulders 54 located near the top of pans 16. Figure 2 shows four of these plates or units 53. Each of said plates or units 53 is provided with suitable apertures for the reception of food dishes or food pans. Food receptacles for steam tables have been standardized to a considerable extent, so that receptacles for vegetables have a decidedly different contour from receptacles for meats. Containers for soups and other articles of food have contours which are standardized to a considerable extent. According to the present invention, the plates or units 53—53 are mounted on the top of the food table in a way to be readily removed and replaced. The present invention contemplates the provision of a number of plates or units 53 having different designs of apertures, whereby to be suitable for any preferred diet; for example, for use in a hospital or sanitarium where certain diets are prescribed, the proper units 53 may be selected for containing receptacles for this diet. For use at a different time or under other conditions, where another diet is prescribed, units 53—53 may be readily changed and the proper food loaded on the food table.

Referring now to the ice cream drawer 39, said drawer comprises a metal receptacle adapted to carry an insulator 55, as shown in Figures 3 and 5. Said insulator 55 is provided with handles 56 by means of which said insulator may be removed for purposes of cleaning. Said insulator comprises a double-walled receptacle, the outer wall of which is indicated by the numeral 57 and the inner wall of which is indicated by the numeral 58. Said walls contain, between them, insulating material such as cork or asbestos. The inner wall 58 provides a receptacle for containing ice and a can 59 for ice cream. A cover 60 may be provided for the insulator 55 if preferred. The described arrangement of drawer 39 and insulator 55 has the advantage that no water of condensation from moisture in the atmosphere will collect outside of the insulator 55 and there will be no tendency to drip from the bottom of the food table.

It will be understood, of course, that the food table has a much broader application than merely to hospitals and sanitariums. In explaining the invention, its applicability to hospitals and sanitariums has been particularly referred to, however, for the purpose of having a concrete example. It will be understood from the foregoing description that the present invention provides, in a single vehicle, the means for supplying food of great variety to a large number of people, it being possible to carry food receptacles of any preferred contour and to keep the food therein hot by means of hot water baths, without the danger of splashing, while at the same time cold foods and drink may be transported without any great amount of heat transfer.

One embodiment of the present invention has been described in detail. Many modifications will occur to those skilled in the art. It is intended to cover in this patent all such modifications that fall within the scope of the invention as defined by the appended claims.

Claims:

1. A portable food table readily convertible for different kinds of food, comprising a frame member, means associated with said frame member for providing a hot water bath, said means comprising a pan having holding means intermediate of its height and a readily removable baffle supported by said holding means for preventing splashing of water, holding means located near the top of said pan, and interchangeable means mounted upon said last mentioned holding means, said interchangeable means being provided with apertures for receiving receptacles for different kinds of food.

2. A portable food table comprising a frame, a pan mounted within said frame, said pan having holding means located intermediate of its height and other holding means located near the top thereof, a readily removable baffle extending around the inside of said pan and supported by said first mentioned holding means, and a readily removable receptacle holding member mounted upon said last mentioned holding means.

3. A portable food table readily convertible for different kinds of food, comprising a frame member, reinforcing angle members at the top of said frame member, a pan having an outwardly extending flange supported by said angle members, said pan being provided along its inner walls with two sets of inwardly projecting hook-shaped members, one of said sets being located intermediate of the height of said pan and the other of said sets being located adjacent to the top of said pan, a readily removable baffle supported by said hook-shaped means intermediate of the height of said pan, and holding means carried by said upper set of hook-shaped members, said holding means being readily interchangeable and being provided with apertures for receiving receptacles for different kinds of food.

Signed at Chicago, Illinois, this 18th day of October, 1921.

OWEN T. WEBBER.